Nov. 16, 1937. R. CULP 2,099,198
LATHE ATTACHMENT
Filed Oct. 21, 1936
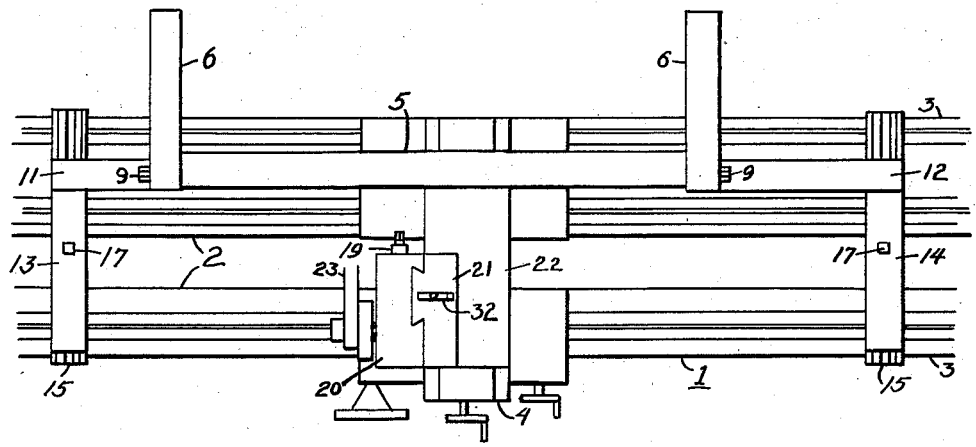
Fig. 1.
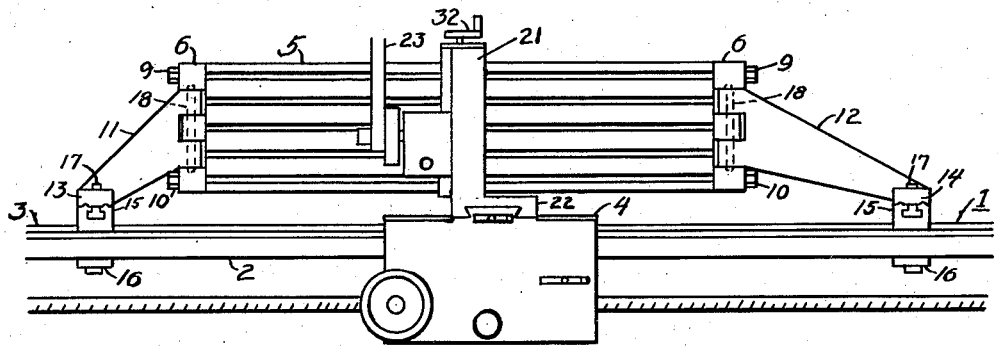
Fig. 2.
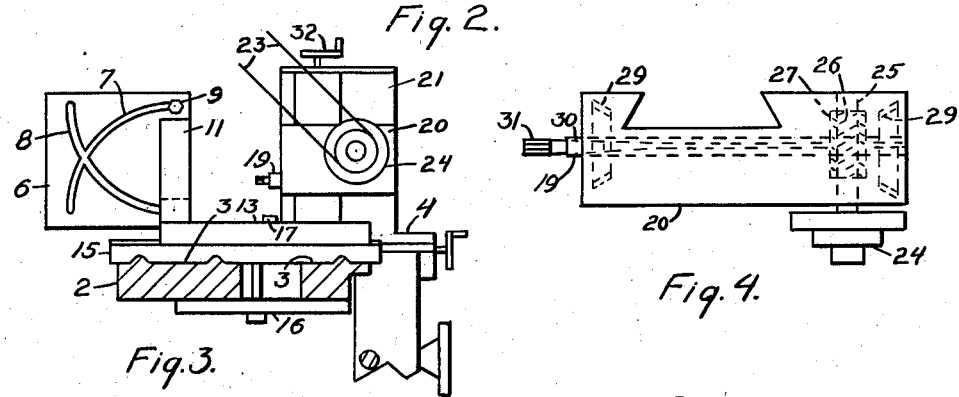
Fig. 3.
Fig. 4.
Roy Culp, INVENTOR.
BY
Barnwell R. King, ATTORNEY.

UNITED STATES PATENT OFFICE 2,099,198

LATHE ATTACHMENT

Roy Culp, Battle Creek, Mich.

Application October 21, 1936, Serial No. 106,838

16 Claims. (Cl. 82—34)

My invention relates to lathe attachments, and more particularly to such attachments wherein the work is held stationary while being acted upon by a moving, power driven tool.

The main objects of my invention are:

First, to provide attachments for greatly increasing the scope of usefulness of conventional lathes.

Second, to provide means adapted to be attached to a lathe for planing, milling, drilling and otherwise working comparatively large pieces of work of the type now worked in expensive machines designed especially for such operations.

Third, to provide improved means for adapting a standard lathe to perform a wide variety of working operations.

Other objects of this invention, not at this time more particularly enumerated, will be understood from the following detailed description of the same.

An illustrative embodiment disclosing the improvements in lathe attachments made according to this invention is shown in the accompanying drawing, in which:

Fig. 1 is a fragmentary plan view.

Fig. 2 is a fragmentary view in front elevation.

Fig. 3 is a fragmentary view in end elevation.

Fig. 4 is a top plan view of the gear carriage.

Referring to the drawing, I is an engine lathe provided with a bed 2 having longitudinal ways 3, 3, and a saddle 4. The saddle is of any standard construction well known to those skilled in the art, as are the other parts of the lathe, which therefore require no further detailed description here.

My novel work holding attachment is mounted near opposite ends of the lathe bed and comprises a work holder 5 disposed above and toward the back of the bed. The work holder is in the form of a solid plate and is provided with T-slots and holes for clamping the work in place thereon. The work holder is supported at its opposite ends by means of end plates 6, 6 having arcuate slots 7 and 8 therein for receiving stud bolts 9 and 10, respectively, which are threaded in the ends of the work holder. This arrangement provides means whereby the work holder may be tilted about an upper or a lower horizontal axis, and secured in the desired tilted position. The arcuate slots preferably extend through an angle of 90 degrees, permitting three sides of the work to be presented to the tool without removal from the work holder.

The end plates 6 are journalled at their forward edges to the inwardly extending flanges 11 and 12 of cross slides 13 and 14, respectively, which are mounted on transverse rails 15, 15. The rails are preferably secured in place to the lathe bed 2 by means of detachable clamps 16, the arrangement being such that the rails may be quickly assembled with or detached from the bed. The cross slides 13 and 14 are movable relative to each other and are secured in adjusted position on their rails by means of bolts 17. The journalled connections 18 between end plates 6 and the flanges of the cross slides provide for the angular adjustment of the work holder relative to the vertical-longitudinal plane of the lathe by changing the relative positions of the slides, without disturbing their parallel relation or that between the end plates 6.

My tool holding attachment comprises a power driven tool holder 19 mounted on the saddle 4. The tool holder is disposed to rotate about an axis arranged in a horizontal position extending transversely to the lathe bed. The tool holder 19 is carried by a gear carriage 20 which is mounted for vertical movement on an upright 21. This upright is preferably fixed to the cross slide 22 of the saddle 4. The arrangement is such that my cross slide 22 may be quickly substituted for the standard cross slide or compound rest of the saddle.

While the tool holder may be power driven in any desired manner I prefer to drive the tool holder through a belt 23 and a pulley 24. The pulley is connected to the outer end of a pinion 25 carrying a worm 26 which meshes with a worm gear 27 on the tool holder 20. The tool holder 19 is supported in the carriage 20 by means of opposed tapered roller bearings 29. The tool holder 19 is provided with a tapered socket 30 for receiving the tapered inner end of the tool 31, in this case an end-milling tool. The belt 23 is driven by any suitable mechanism, not shown, permitting the carriage 20 to be moved vertically, transversely and longitudinally relative to the lathe bed. Thus the work clamped to the work holder may be readily planed, milled, bored and the like as desired through the use of my attachments.

The means I prefer to use for raising and lowering the carriage 20 comprises a hand operated screw turning crank 32 disposed above the upright 21. It is believed that the operation of my attachments will be apparent to those skilled in the art. They are designed for use with conventional lathes, and although they are simple and economical in their parts, they greatly increase the scope of usefulness of such machines.

I claim:

1. The combination with an engine lathe provided with a lathe bed having longitudinal ways, and a saddle, of a work holding attachment mounted on said bed, and a tool holding attachment mounted on said saddle, the work holding attachment comprising spaced transverse rails secured to said longitudinal ways for adjustment longitudinally thereof, cross slides secured to said rails for adjustment longitudinally thereof and transversely of said longitudinal ways of the lathe bed, vertical end supports journalled to said cross slides and arranged in spaced parallel relation above and toward the back of the lathe bed, a work holder disposed between said end supports, and means connecting said work holder to said end supports so that the work holder may be turned up or down through an arc of 90 degrees and secured in adjusted position, and the tool holding attachment comprising an upright fixed to the saddle, a gear carriage connected to said upright for vertical movement, means for moving said gear carriage up and down relative to said upright, a horizontal tool holder carried by said gear carriage and disposed transversely of said longitudinal ways of the lathe bed for co-operation with said work holder, and means acting to rotate said tool holder including a pulley driven worm and worm gear carried by said gear carriage.

2. The combination with a lathe provided with a lathe bed having longitudinal ways, and a saddle, of a work holding attachment mounted on said bed, and a tool holding attachment mounted on said saddle, the work holding attachment comprising spaced transverse rails secured to said longitudinal ways for adjustment longitudinally thereof, cross slides secured to said rails for adjustment longitudinally thereof and transversely of said longitudinal ways of the lathe bed, vertical end supports journalled to said cross slides and arranged in spaced parallel relation above and toward the back of the lathe bed, a work holder disposed between said end supports, and means connecting said work holder to said end supports so that the work holder may be turned up or down and secured in adjusted position, and the tool holding attachment comprising an upright fixed to the saddle, a carriage connected to said upright for vertical movement, means for moving said carriage up and down relative to said upright, a horizontal tool holder carried by said carriage and disposed transversely of said longitudinal ways of the lathe bed for cooperation with said work holder, and means acting to rotate said tool holder.

3. The combination with a lathe provided with a lathe bed having longitudinal ways, and a saddle, of a work holding attachment mounted on said bed, and a tool holding attachment mounted on said saddle, the work holding attachment comprising spaced transverse rails secured to said longitudinal ways for adjustment longitudinally thereof, cross slides secured to said longitudinal ways of the lathe bed, vertical end supports connected to said cross slides and arranged in spaced parallel relation above and toward the back of the lathe bed, a work holder disposed between said end supports, and means connecting said work holder to said end supports so that the work holder may be tilted and secured in adjusted position, and the tool holding attachment comprising an upright fixed to the saddle, a carriage connected to said upright for vertical movement, means for moving said carriage up and down relative to said upright, a horizontal tool holder carried by said carriage and disposed transversely of said longitudinal ways of the lathe bed for cooperation with said work holder, and means acting to drive said tool holder.

4. The combination with a lathe provided with a lathe bed having longitudinal ways, and a saddle, of a work holding attachment mounted on said bed, and a tool holding attachment mounted on said saddle, the work holding attachment comprising spaced transverse rails secured to said longitudinal ways for adjustment longitudinally thereof, cross slides secured to said rails for adjustment longitudinally thereof and transversely of said longitudinal ways of the lathe bed, vertical end supports connected to said cross slides and arranged in spaced parallel relation above and toward the back of the lathe bed, a work holder disposed between said end supports, and the tool holding attachment comprising an upright fixed to the saddle, a carriage connected to said upright for vertical movement, means for moving said carriage up and down relative to said upright, a horizontal tool holder carried by said carriage and disposed transversely of said longitudinal ways of the lathe bed for cooperation with said work holder, and means acting to drive said tool holder.

5. The combination with a lathe provided with a lathe bed having longitudinal ways, and a saddle, of a work holding attachment mounted on said bed, and a tool holding attachment mounted on said saddle, the work holding attachment comprising spaced transverse rails clamped to said longitudinal ways, cross slides secured to said rails for adjustment transversely of said longitudinal ways of the lathe bed, a work holder disposed between said cross slides, and means connecting the ends of said work holder to said cross slides, and the tool holding attachment comprising an upright fixed to the saddle, a carriage connected to said upright for vertical movement, means for moving said carriage up and down relative to said upright, a horizontal tool holder carried by said carriage and disposed transversely of said longitudinal ways of the lathe bed for cooperation with said work holder, and means acting to drive said tool holder.

6. The combination with a lathe provided with a lathe bed having longitudinal ways, and a saddle, of a work holding attachment mounted on said bed, and a tool holding attachment mounted on said saddle, the work holding attachment comprising spaced transverse rails clamped to said longitudinal ways, cross slides secured to said rails for adjustment transversely of said longitudinal ways of the lathe bed, a work holder disposed between said cross slides, and means connecting the ends of said work holder to said cross slides, and the tool holding attachment comprising an upright fixed to the saddle, a carriage connected to said upright for vertical movement, means for moving said carriage up and down relative to said upright, a tool holder carried by said carriage for cooperation with said work holder, and means acting to drive said tool holder.

7. The combination with a lathe provided with a lathe bed, and a saddle, of a work holding attachment mounted on said lathe bed, and a tool holding attachment mounted on said saddle, the work holding attachment comprising a work holder disposed above and toward the rear of the lathe bed, and means supporting said work holder for horizontal and vertical inclination relative to the lathe bed, and the tool holding attachment comprising a tool holder, means supporting said tool holder for rotation about a horizontal axis extending transversely of said lathe bed, and means for raising and lowering said tool holder supporting means.

8. The combination with a lathe provided with a lathe bed, and a saddle, of a work holding attachment mounted on said lathe bed near the opposite ends thereof and comprising a work holding plate disposed above and toward the rear of said lathe bed, and means for securing said work holding plate in adjusted inclined position relative to the vertical-longitudinal plane of the lathe bed, and a tool holding attachment mounted on said saddle and comprising a tool holding shaft disposed in a horizontal position above and transversely of the lathe bed, and means for raising and lowering said tool holding shaft for milling and the like.

9. The combination with an engine lathe having a bed provided with longitudinal ways, of transverse rails mounted on said bed near opposite ends of said ways, cross slides mounted on said rails and having vertical inwardly extending flanges, end plates journalled to the inner edges of said flanges for spaced parallel movement about vertical axes, said plates having arcuate slots therein, a work holder connected to said end plates through said slots so that it may be tilted about a horizontal axis, and means for securing said work holder in adjusted position relative to said end plates, the journalled connections between said end plates and flanges of the cross slides acting to preserve the parallel relation between said end plates when said cross slides are adjusted on their rails to incline said work holder relative to the lathe bed.

10. The combination with a lathe having a bed provided with longitudinal ways, of transverse rails clamped to said bed near opposite ends of said ways, cross slides mounted on said rails, end plates journalled to rails for spaced parallel movement about vertical axes, a work holder connected to said end plates so that it may be tilted about a horizontal axis, and means for securing said work holder in adjusted position relative to said end plates, the journalled connections between said end plates and cross slides acting to preserve the parallel relation between said end plates when said cross slides are adjusted on their rails to incline said work holder relative to the lathe bed.

11. The combination with a lathe having a bed provided with longitudinal ways, of transverse rails mounted on said bed near opposite ends of said ways, cross slides mounted on said rails, and a work holder connected to said rails.

12. The combination with a lathe having a bed provided with a saddle, of a work holder mounted on said bed to support the work above and longitudinally of the bed, means supporting said work holder so that it may be tilted from the vertical, means carrying said supporting means so that the work holder and said supporting means may be angularly inclined relative to the longitudinal axis of the bed, and a driven tool holder mounted on said saddle to rotate about an axis disposed above and transversely of said bed, and means for raising and lowering said tool holder on said saddle.

13. The combination with a lathe bed provided with a saddle, of a power driven tool holder mounted on said saddle for vertical movement, and a work holder disposed above and toward the back of said lathe bed, means for tilting and securing said work holder in adjusted position about horizontal upper and lower axes, means for turning and securing said work holder in adjusted position about vertical end axes, and means for moving and securing said work holder in adjusted position relative to the lathe bed.

14. The combination of a cross slide adapted to fit the standard saddle of an engine lathe, a power driven tool holder mounted on said cross slide for vertical movement as well as longitudinal and transverse movement relative to the lathe bed, a work holder disposed above and toward the back of the lathe bed, means for adjusting the position of said work holder relative to the vertical-longitudinal plane of the lathe bed, and means for securing said work holder in adjusted position.

15. For attachment to a standard engine lathe having a lathe bed provided with a saddle, the combination of a power driven tool holder adapted to be mounted for vertical movement on the cross slide of the saddle and adapted to rotate the tool about an axis disposed transversely of the lathe bed, a work holder adapted to be disposed above the cross slide and longitudinally of the lathe bed and facing said tool holder, and means for connecting the ends of said work holder to the lathe bed.

16. For attachment to a standard engine lathe having a lathe bed provided with a saddle, the combination of a power driven tool holder adapted to be mounted for vertical movement on the cross slide of the saddle and adapted to rotate the tool about an axis disposed transversely of the lathe bed, a work holder adapted to be disposed above the cross slide and longitudinally of the lathe bed and facing said tool holder, and means for supporting said work holder in position relative to the lathe bed.

ROY CULP.